United States Patent [19]

Ohlmeyer et al.

[11] Patent Number: 4,725,290
[45] Date of Patent: Feb. 16, 1988

[54] METHOD FOR THE PURIFICATION OF AIR OR GAS STREAMS BY A MULTI-PATH ADSORPTION PRINCIPLE AND MOVING-BED FILTERING APPARATUS FOR PERFORMING THE METHOD

[75] Inventors: Manfred Ohlmeyer, Eggenstein-Leopoldshafen; Jürgen Wilhelm, Gondelsheim; Hans-Georg Dillmann, Eggenstein-Leopoldshafen, all of Fed. Rep. of Germany

[73] Assignee: Kernforschungszentrum Karlsruhe GmbH, Karlsruhe, Fed. Rep. of Germany

[21] Appl. No.: 930,500

[22] Filed: Nov. 14, 1986

[51] Int. Cl.$^4$ .............................................. B01D 53/06
[52] U.S. Cl. ............................................ 55/77; 55/99; 55/390; 55/479; 55/482
[58] Field of Search ................. 55/77, 79, 99, 350, 55/390, 484, 479, 512, 482; 210/268, 283–286

[56] References Cited

U.S. PATENT DOCUMENTS

| | | | |
|---|---|---|---|
| 4,133,660 | 1/1979 | Steiner | 55/479 |
| 4,263,028 | 4/1981 | Ohlmeyer et al. | 55/79 |

FOREIGN PATENT DOCUMENTS

| | | | |
|---|---|---|---|
| 41572 | 12/1887 | Fed. Rep. of Germany | 55/479 |
| 2732204 | 2/1979 | Fed. Rep. of Germany | 55/474 |
| 2813691 | 10/1979 | Fed. Rep. of Germany | 55/350 |

*Primary Examiner*—Bernard Nozick

[57] ABSTRACT

For the purification of air or gas streams the air or gas is conducted across a multi-zone adsorption apparatus through which a particulate filter material is moved downwardly by gravity. The gas stream is first admitted to the adsorption apparatus adjacent the downstream end to a first stage having an upstream and a downstream zone and, upon leaving the first stage, is divided into partial streams which are conducted back through an upstream adsorption material stage such that the gas from the most downstream filter material zone of the first stage which still has the highest contaminant content is admitted to and passed through the most upstream filter material zone of an upstream second stage of the apparatus and the upstream zone gas or air from the first stage is admitted to the downstream zone of the first stage in order to provide for high decontamination efficiency and for similar end decontamination of all the gas or air passed through the apparatus.

7 Claims, 5 Drawing Figures

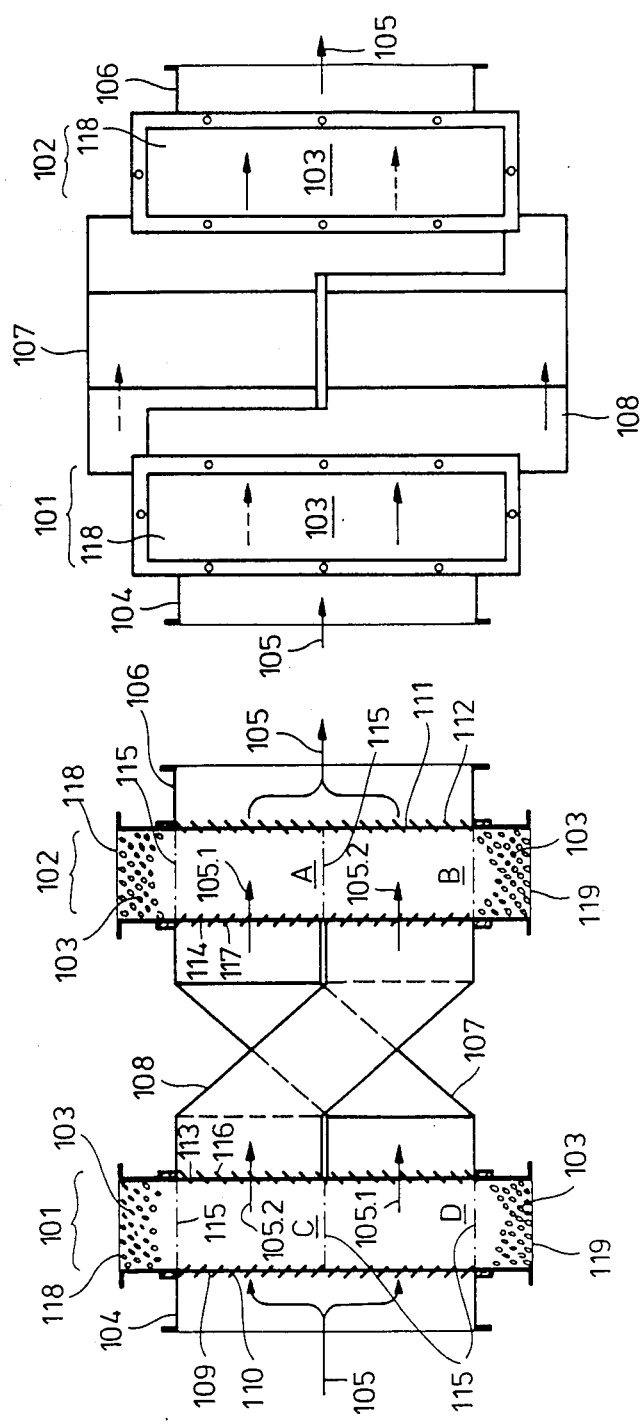

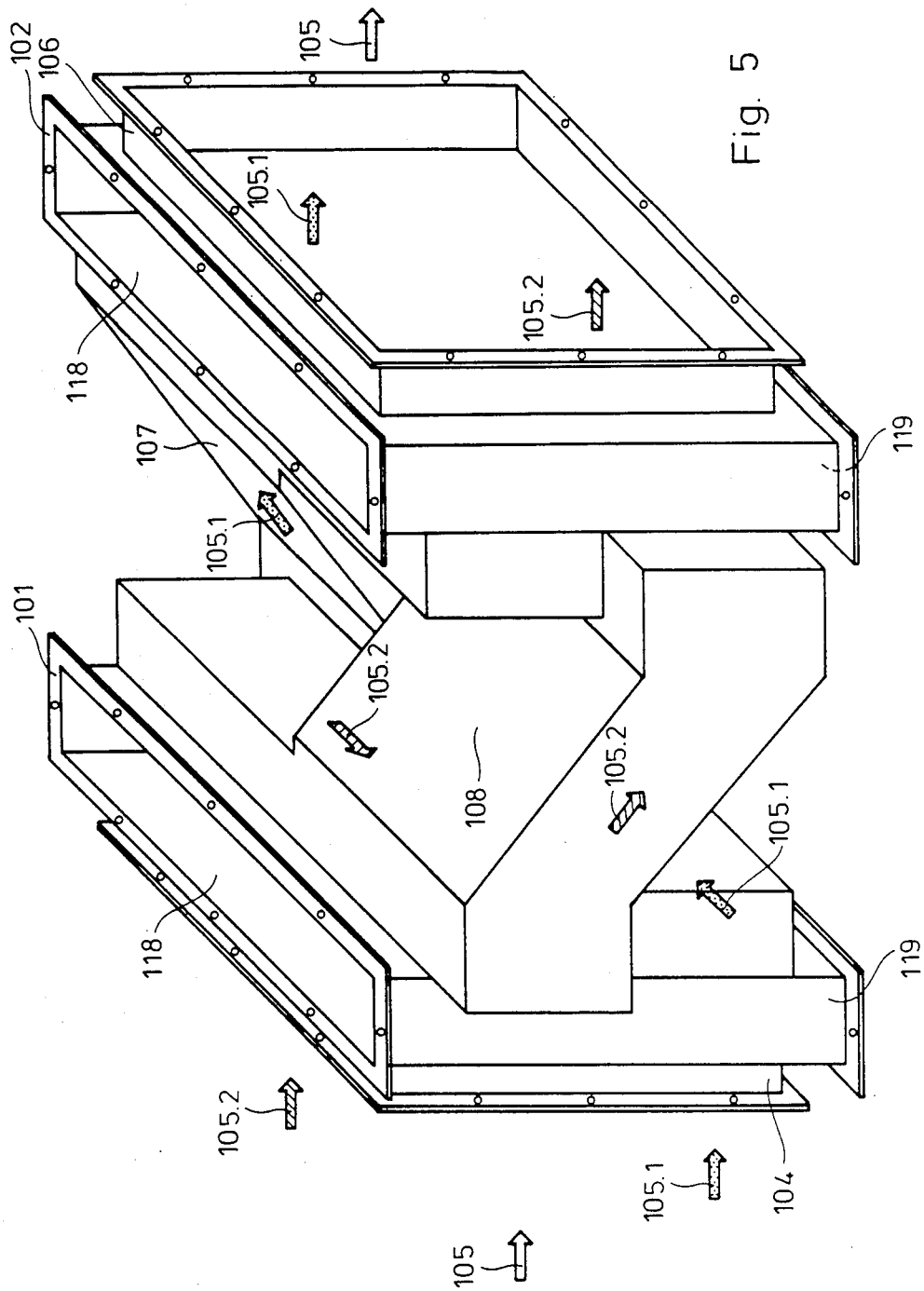

4,725,290

METHOD FOR THE PURIFICATION OF AIR OR GAS STREAMS BY A MULTI-PATH ADSORPTION PRINCIPLE AND MOVING-BED FILTERING APPARATUS FOR PERFORMING THE METHOD

BACKGROUND OF THE INVENTION

The present invention relates to a method for the purification of air or gas streams by a multi-path adsorption principle in connection with a moving-bed filtering apparatus in which the gas streams are conducted through at least two multi-zone shifting bed adsorption stages arranged in series with one another.

In each of the filters the particle content of the gas stream is reduced to a degree which depends on the adsorption or filter bed material, the hydrostatic pressure differential which depends on the height of the filter bed and the filter bed density, the flow velocity and the filler apparatus charge which is dependent on the flow velocity and, with a continuously moving bed, the charge of the filter bed which increases in the direction of movement of the filter bed.

It has been tried to improve the filtering or adsorption process in single bed cross-flow filters to some degree by changing the bed height and in multiple bed filters by a partial subsequent filtering step. However the utilization of the filtering and adsorption materials remains unsatisfactory. It can be improved to some degree only in filter apparatus with not-continuously moving filter beds.

Baffles have been provided in elbows of ducts in order to reduce the flow resistance but such measures have failed to appreciably improve the overall filter efficiency of the filter material in a multiple path adsorption filter apparatus.

It is an object of the present invention to provide a method of purifying air or gas streams and to provide a suitable moving-bed filter apparatus with which the effectiveness of the filter or the adsorption material in the filter beds is close to the theoretical design values of the filters and this object should be achievable with continuous as well as discontinuous operation of the moving filter beds.

It is further an object of the present invention to facilitate performing of the purification method also with a moving filter apparatus including two serially arranged and vertically disposed filter chambers or stages in which the filter material of the secondary chamber or stage may be switched over to the first chamber or stage.

The present invention is applicable in connection with filtering as well as adsorption processes and apparatus and the two terms are therefore used interchangeably in the present sepcification.

SUMMARY OF THE INVENTION

For effective and efficient decontamination of air and gas streams, an air or gas stream is conducted across a multi-zone absorption apparatus having a housing through which particulate adsorption material is moved downwardly by gravity. The housing has a first downstream adsorption stage and a second upstream absorption stage through which the gas or air is sequentially conducted. Upon passing through the downstream and upstream zones of the first stage the stream is divided into partial streams which are separately admitted to the upstream adsorption stage such that the gas or air from the downstream zone of the first adsorption stage which has still a relatively high contaminant content is admitted to the upstream zone of the second adsorption stage which contains adsorption material of little or no charge and the gas or air from the upstream or first zone of the first adsorption stage which has a relatively lower contaminant content is admitted to the downstream zone of the second adsorption stage which receives the adsorption material from the first zone of ths second adsorption stage.

In this manner the air or gas leaving the apparatus has a balanced relatively high degree of purity.

The principal advantage of the present invention resides in the fact that with the multi-stage or multi-passage absorption filters with moving filter beds the flow of the gas to be filtered after having passed through the first filter stage is so controlled that the streams leaving the first stage with still relatively high content of impurities are directed to a filter section of the subsequent filter stage which section is subjected to a lower load than the other subsequent stage filter sections. In order to optimize operation the filter beds may have sections of different sizes or of different filter thickness. With such relatively simple gas or air conducting procedures the filtering or adsorption efficiency, that is, the filter or adsorption material utilization, is greatly improved. With equal filter material utilization—as compared to prior art arrangements—improved total depositing rates can be achieved or, for equal depositing rates, a reduction of filter material requirements and a reduction in pressure losses in the filtering apparatus can be achieved so that the expenses for regeneration of the gas and removal of impurities therefrom is achieved. It is noted that the invention may be utilized for the removal from gas or air streams of all kinds of impurities or noxious materials. The separation of the gas flow into various streams also facilitates any possible admixing of additives in the various filtering or adsorption stages of a plant, for example, the addition of ammonia in the conversion of $NO_x$ may be adjusted exactly in accordance with the amount of noxious materials remaining in the stream so that excessive admixing of additives may be easily avoided.

If the housing arrangement of the moving filter bed apparatus is in accordance with the second embodiment, the filtering or adsorption efficiency of the apparatus or the utilization of the filter or adsorption material is further improved so that with a given amount of filter material improved deposition rates or a given deposition rate, a reduction in filter material requirements, a reduction in pressure losses for the gases passing through the filter and a reduction in costs for the regeneration of the depleted filter or adsorption materials can be achieved.

SHORT DESCRIPTION OF THE DRAWINGS

Details of the method and the respective switchable moving filter bed apparatus will become more readily apparent from the following description thereof on the basis of the enclosed Figures wherein:

FIG. 3 is a side sectional view of a housing arrangement for the moving-bed filter apparatus in accordance with a second embodiment with two serially arranged filtering stages for the performance of the method according to the invention;

FIG. 4 is a top vie of the apparatus of FIG. 3; and

FIG. 5 is a perspective side view of the apparatus of FIG. 3.

DESCRIPTION OF THE PREFERRED EMBODIMENTS

Figure 1:
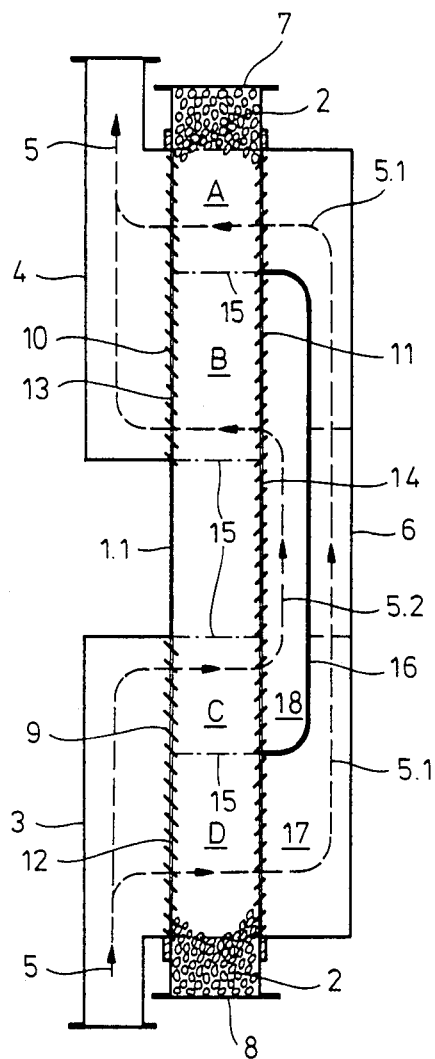
FIG. 1 shows the housing arrangement of a moving filter bed apparatus of the multiple path adsorption type by means of which the method according to the invention is performed.

FIG. 1 shows schematically a filter housing consisting essentially of a filter chamber 1.1 for the reception of fluid particulate filter or adsorption material which serves as a moving bed for the multiple-path filter or adsorption method, the connecting manifolds 3 and 4 mounted on the chamber 1.1 for the admission of the gas stream 5 to be purified and the removal of the purified gas stream and a guide duct 6 for containing the gas streams 5.1, 5.2. This arrangement provides for two cleaning stages, the first, lower stage comprising filter bed zones D and C and a second, upper stage comprising filter bed zones B and A. The zone limits are indicated in all Figures by dash-dotted lines 15. The raw gas stream 5 is admitted to the lower stage by way of manifold 3. After passing through the zones D and C representing the first filter or adsorption stage, the gas stream is conducted through the guide duct 6 back to the moving filter bed and through the zones A and B to the upper manifold 4 through which the gas stream is discharged in a clean state. Supply of filter material such as fresh activated charcoal to the chamber is by way of an upper fill opening 7 whereas removal of charcoal from the chamber 1.1 occurs by way of a lower discharge opening 8. As a result the filter bed flows downwardly from the top sequentially through the zones A, B, C and D delineated by dash-dotted lines 15. The filter housing 1 consists of a vertical sheet metal housing having walls with air passages formed therein, for example, walls of screens 9, 10 and 11 with shielded openings 12, 13 and 14 wherein the openings of the screens 9, 10, 11 are smaller in diameter than the grains of the particulate filter materials. The manifolds 3 and 4 are sealingly mounted on the housing 1 so as to cover the supply and discharge openings 12 and 13 and the guide duct 6 is sealingly mounted on the housing 1 so as to cover the intermediate opening 14. The space between the upper edge of opening 12 and the lower edge of opening 13 is large enough that the partial gas stream, which may move directly through the filter material and not through the guide duct 6, has the same residence time in the filter bed as the main gas stream such that this space is normally twice the filter bed thickness. There is provided within the guide duct 6 a divider baffle 16 which divides the guide duct interior into two separate channels 17 and 18. Each of the separate channels 17 and 18 is associated with one of the zones D or C of the first stage and arranged opposite the supply opening 12 such that the gases leaving the zones D and C are conducted to the second stage in separate channels. The arrangement is such that channel 17, which is in communication with the lower zone D, guides the partial gas stream 5.1 to the uppermost zone A and channel 18 guides the partial gas stream 5.2 from the zone C to the zone B. After passage through zones A and B the clean gas is conducted away through the discharge manifold 4. The position of the divider baffle 16 is variable such that the zones D and C or A and B may be made equal in size (see filter chambers 1.2 and 1.3 in FIG. 2) or that the one zone is, for example, twice the size of the other (see FIG. 1 or arrangement 1.4 of FIG. 2). The divider baffle 16 may be firmly mounted in place or it may be movable. Also there may be provided more than one such divider baffle 16 so that more than two channels are formed and correspondingly more separate filter zones are formed.

The principle of operation of the air or gas purification in the housing 1 is as follows: For passage through the first filter stage the gas stream 5 is divided into partial streams 5.1 and 5.2 depending on the degree of impurity content which partial streams are supplied to certain areas of the second filter stage depending on the degree of charge of the filter material therein. The partial stream 5.1 from the lowermost zone D, that is, the partial stream with the lowest degree of purification—since the zone D has the largest charge of impurities—is supplied to the uppermost zone A of the second stage which zone A contains fresh filter material with the lowest charge of impurities. The partial stream 5.2 from the zone C which with a greater degree of purification is conducted to the zone B wherein the filter material has already a greater charge of impurities than the material in the zone A. Altogether the filter material 2 can be fully charged in this manner before it leaves the housing 1.1.

Figure 2:
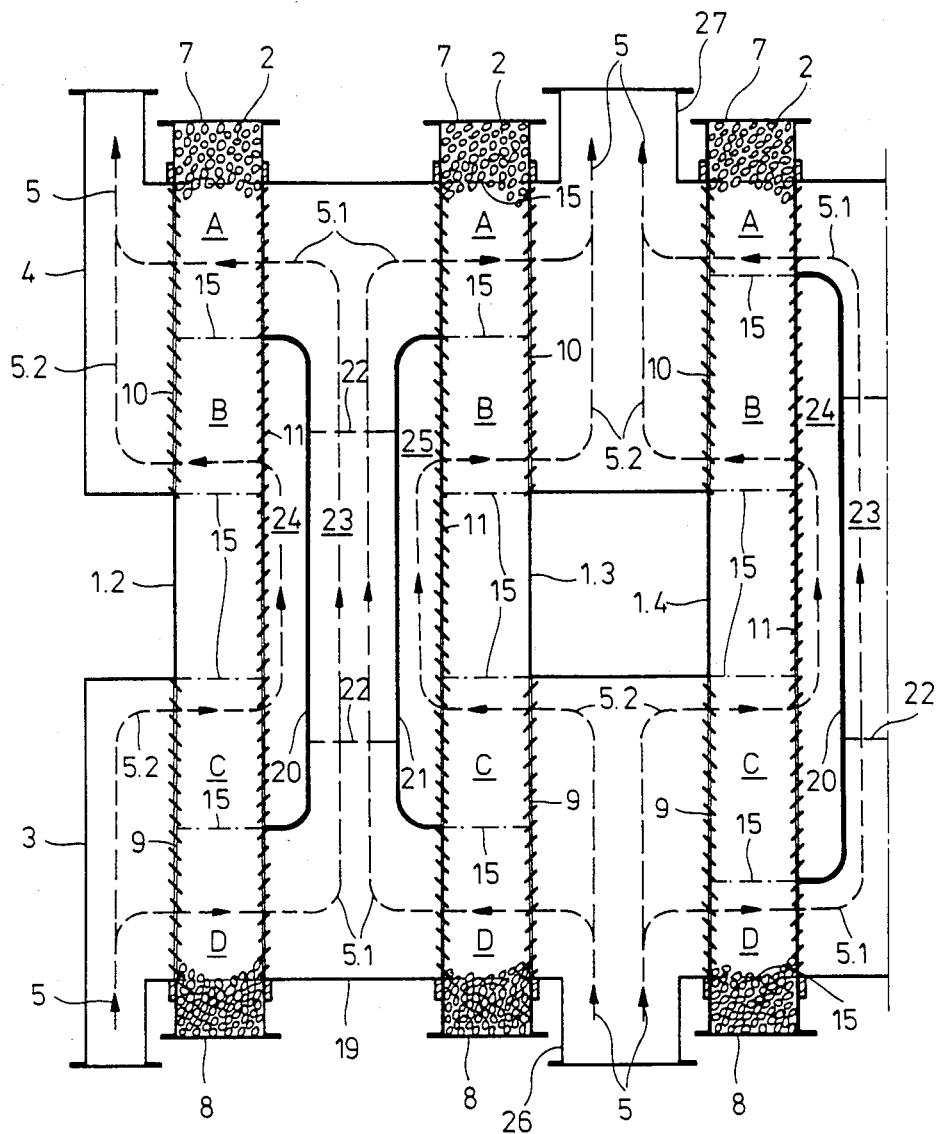
FIG. 2 shows a housing for three or more filter beds arranged in parallel, with baffles shown to be arranged differently at the left and right-hand sides.

In FIG. 2, features which are equivalent to those in FIG. 1 are indicated by the same reference numerals used in FIG. 1. There is shown a number of parallel filter chambers of which two chambers 1.2 and 1.3 shown at left and center have a common chamber 19. The chamber 19 contains two divider baffles 20 and 21 which are maintained in spaced relationship by struts 22 and mounted on the walls of chamber 19. A common partial stream channel 23 for the partial gas streams 5.1 from the zones D to zones A of the two filter chambers 1.2 and 1.3 and the partial stream channels 24 and 25 for the partial gas streams 5.2 from zones D to zones B are formed by the two divider baffles 20 and 21. In this arrangement the dividing line 15 between the zones is so positioned that the zones C and D and the zones A and B have the same height. In principle however the arrangement is the same as the one shown in FIG. 1 with regard to chamber 1.1.

Both filter chambers 1.3 and 1.4 in the center and right-hand part of FIG. 2 have common gas supply and discharge manifolds 26 and 27 for the admission and discharge of the gas stream or streams 5. In filter chamber 1.4 the zones C and B are shown to have twice the height of zones D and A. The separation principle for dividing the gas stream 5 into partial streams which are conducted to zones of different state of charge of the following filtering stages depending on the degree of charge of the streams however is the same as that described with regard to the arrangement of FIG. 1. Both filter housings which are arranged in parallel have the same zone arrangement.

Assuming a housing arrangement like that shown in FIG. 1 without separation of the air stream 5 into partial streams 5.1 and 5.2 and defining the same zones A, B, C and D from top to bottom wherein in zones of equal height or filter material thickness during continuous operation, decontamination factors DF of $$DF_A = 100 \quad \text{and} \quad DF_B = 10$$

-continued

| | |
|---|---|
| $DF_C = 3$ | $DF_D = 1.5$ | are obtained for the various zones and the decontamination factor DF represents the ratio of the contaminant concentration of the air before entering the filter housing over the concentration after passage through the filter housing, a total decontamination factor of a prior art filtering plant without stream separation, that is, with mixing of the gas, is obtained which is:

$$DF_{TOTAL} = \frac{4 \times DF_A \times DF_B \times DF_C \times DF_D}{(DF_A + DF_B) \times (DF_C + DF_D)} = 36.5$$

For the method performed in the moving filter bed arrangement in accordance with the invention, that is, with partial stream separation and conduction of the partial streams through different filter zones in the separate stages, the total decontamination factor is:

$$DF_{TOTAL} = \frac{2 \times DF_A \times DF_B \times DF_C \times DF_D}{(DF_A \times DF_B) + (DF_B \times DF_C)} = 50.0$$

that is, an improvement of about 37% is achieved. The filtering efficiency of a filtering plant is determined by:

$$\eta = 100 - \frac{100}{DF_{TOTAL}} \, [\%]$$

The method described is based on the recognition that the air or gas stream leaving the first stage is of different purity depending on the level of the filter bed from which it emerges since the degree of loading of the filter bed increases with the travel direction of the filter bed which moves downwardly with gravity. The degree of decontamination of a filter stage may be expressed—as previously mentioned—by way of the decontamination factor DF which represents the ratio of contaminant concentration at the filter entrance to contaminant concentration at the filter outlet.

The arrangement of FIGS. 3 to 5 in principle is the same as that of FIG. 1 with the exception that the zones A, B and C, D are disposed in separate housings.

FIG. 5 is an elevational view which shows the filter housing of the Multiple-Way Sorption method (MWS) consisting essentially of the filter chambers 101 and 102 for the reception of the flowable particulate filtering or adsorbing material 103 which represents the moving bed. The chambers 101 and 102 have upper inlet openings 118 and lower discharge openings 119 and sealingly connected thereto air or gas inlet and outlet chambers 104 and 106 for the introduction and the removal of the air or gas stream 105 and further intermediate ducts 107 and 108 providing for communication from zone D to zone A and from zone C to zone B.

The two filter chambers 101 and 102 arranged in sequence, one after the other, provide for the two serially disposed filtering stages, the first comprising the filter bed zones D and C and the second comprising the filter bed zones B and A wherein D and B form the lower and C and A form the upper parts of the stages. The boundaries of the zones are indicated in FIG. 3 by dash-dotted dividing lines 115.

As indicated in FIGS. 3 to 5 the raw air or gas stream 105 is admitted by way of the inlet chamber 104 and passes through the opening 109 provided with a screen 110 into the first filter stage of the filter chamber 101. The cleaned gas or air is discharged from the second filter stage through the opening 111 which is also provided with a screen 112 and into the outlet chamber 106. The intermediate ducts 107 and 108 which provide for communication between the zones C and B and the zones D and A of the first and second filtering stages, that is, of the filtering chambers 101 and 102, are connected to the wall areas of the openings 113 and 114 which are also provided with screens 116 and 117. If sieves are used in place of the screens, the sieve openings need to be smaller than the size of the filter material particles 103 so as to retain the filter bed in the filter housings.

The two intermediate ducts 107 and 108 which together provide for horizontal communication between the first filter stage, that is, the zones C and D, and the second filter stage, that is, zones A and B, are in a particular manner so arranged that the lower zone D of the first stage is in communication with the upper zone A of the second stage and the upper zone C of the first stage is in communication with the lower zone B of the second stage. With the given arrangement the air or gas stream 105 is divided into two partial streams 105.1 and 105.2 of which the originally upper partial stream 105.2 after passage of the zone C is conducted through the lower zone B of the second stage and the originally lower partial stream 105.1 after passage of the zone D is conducted through the upper zone A of the second stage. The two streams 105.1 and 105.2 and the respective ducts 107 and 108 are arranged to cross-over as it is shown in FIGS. 3 to 5.

In this manner the partial stream 105.1 from the zone D of the first stage, which is purified to a lesser degree than the stream 105.2 from the zone C of the first stage, is conducted to the zone A of the second stage, which is charged to a lesser degree than zone B of the second stage, and vice versa, the relatively clean stream 105.2 from zone C of the first stage is conducted to the relatively charged zone B of the second stage. As a result the method as utilized with the apparatus of FIG. 1 is, in principle, also utilized with two filter housings 101 and 102 arranged in parallel which, with respect to the air or gas stream, are arranged in series and whose filter bed material in zones A and B of the second stage, after intial charging therein, is transferred to the first stage for passage through the zones C and D therein.

Assuming now, the use of a filter housing as shown in FIG. 5 but without separation of the gas stream 105 into partial streams 105.1 and 105.2 and without the given zone assignment and assuming further a laminar gas stream through the filter housings, that is, without gas mixing, and defining corresponding zones A, B, C and D which have the decontamination factors as previously indicated such that, like in the arrangement described in connection with FIG. 1, a single gas stream passes first through the zones C and D which are disposed on top of one another and then at the same rate through the zones A and B which are also disposed on top of one another, the following decontamination factor is calculated:

$$DF_{TOTAL} = \frac{2 \times DF_A \times DF_C \times DF_D \times DF_B}{DF_A \times DF_C + DF_D \times DF_B} = 28.5$$

For the present moving filter bed arrangement with gas stream separation and separate gas supply to the various zones of the different stages as shown in FIGS. 3 to 5, the total decontamination factor is again:

$$DF_{TOTAL} = \frac{2 \times DF_A \times DF_B \times DF_C \times DF_D}{DF_A \times DF_D + DF_D \times DF_B} = 50.0$$

that is, an improvement of 75% is achieved. The filtering efficiency of the filtering plant is determined by:

$$\eta = 100 - \frac{100}{DF_{TOTAL}} [\%]$$

LISTING OF REFERENCE NUMERALS

A - Filter bed zone  
B - Filter bed zone  } in the second filtering stage

C - Filter bed zone  
D - Filter bed zone  } in the first filtering stage 1.1 - filter chamber  
1.2 - filter chamber  
1.3 - connecting manifold  
1.4 - connecting manifold  
2 - filter or adsorption material  
3 - connecting manifold  
4 - discharge manifold  
5 - gas or air stream  
5.1 - partial gas stream  
5.2 - partial gas stream  
6 - guide duct  
7 - upper fill opening  
8 - lower discharge opening  
9 - screen  
10 - screen  
11 - screen  
12 - supply opening  
13 - discharge opening  
14 - intermediate opening  
15 - zone dividing line  
16 - divider baffle  
17 - separate channel  
18 - separate channel  
19 - common chamber  
20 - divider baffle  
21 - divider baffle  
22 - strut  
23 - channel  
24 - channel  
25 - channel  
26 - supply manifold  
27 - discharge manifold 101 - filter chamber  
102 - filter chamber  
103 - filtering or adsorbing material  
104 - inlet chamber  
105 - gas stream  
105.1 - partial gas stream  
105.2 - partial gas stream  
106 - outlet chamber  
107 - intermediate duct  
108 - intermediate duct  
109 - opening  
110 - screen  
111 - opening  
112 - screen  
113 - opening  
114 - opening  
115 - dividing line  
116 - screen  
117 - screen  
118 - inlet opening  
119 - discharge opening

What we claim is:

1. A method for the purification of air or gas streams by conducting the streams through a multi-stage adsorption housing arrangement including beds of particulate absorption material and having first and second zoned adsorption stages each with upper and lower zones across which the gas streams are sequentially conducted and through which the adsorption material moves downwardly as a result of gravity, comprising the steps of:

supplying the gas stream to be purified to said first adsorption stage, dividing the gas stream emanating from the upper and lower zones of the first adsorption stage into partial streams, supplying said partial streams to different adsorption zones of the second adsorption stage depending on the degree of decontamination experienced by the gas stream in the first adsorption stage, in which the stream passed through an adsorption material of a given charge in such a manner that the partial stream leaving the lower zone of the first stage with a relatively low degree of purity is admitted to the upper zone in the second stage which contains adsorption material with a relatively low charge of contaminants and, vice versa, the other partial stream leaving the first upper zone stage with a relatively higher degree of purity is admitted to the lower zone in the second stage which contains adsorption material with a relatively higher charge of contaminants.

2. A moving-bed filtering apparatus for the purification of air or gas streams, said apparatus comprising: a housing defining a vertically arranged filter chamber having top and bottom ends and receiving fluid particulate adsorption material forming a downwardly moving filter bed within said filter chamber, means for supplying said adsorption material into the top end of said filter chamber, means for removing the adsorption material from the bottom end of said chamber, said filter chamber having first and second adsorption stages with inlet and outlet manifolds connected thereto for supplying air or gas to said first stage and for removing it from said second stage, each of said stages having upper and lower adsorption zones, at least one channel extending between the first and second adsorption stages of said housing so as to supply the gas stream from the first adsorption stage to the second adsorption stage, which is disposed with respect to the movement of the material through said adsorption chamber, upstream of said first adsorption stage, and divider means disposed within said channel so as to provide a communication path between the lower absorption zone of the first adsorption stage and the upper adsorption zone of the second adsorption stage and between the upper adsorption zone of the first adsorption stage and the lower adsorption zone of the second absorption stage such that the gas achieving the lowest degree of decontamination in the first adsorption stage is admitted to the adsorption zone of the second stage which contains the adsorption material with the lowest charge of contaminants and the gas achieving the highest degree of decontamination in the first adsorption stage is admitted to the adsorption zone of the second stage which contains the adsorption material with the highest second stage contamination charge.

3. A moving-bed filtering apparatus according to claim 2, wherein said divider means comprises at least one baffle disposed in said channel and extending over its full length so as to divide said channel between the two stages into channel sections whose inlet and outlet ends are associated with the chamber zones with the differently charged adsorption materials.

4. A moving-bed filtering apparatus according to claim 3, wherein said baffles are movably disposed in said channel along the said chamber so as to permit the changing of the sizes of the zone associated with their inlet and outlet ends.

5. A moving-bed filtering apparatus according to claim 2, wherein at least two of said housings are arranged side by side in spaced relationship and the space between said two housings is used as said gas or air conducting channel.

6. A moving-bed filtering apparatus for the purification of air or gas streams, said apparatus comprising two housings arranged in parallel, each defining a vertically arranged filter chamber having top and bottom ends and receiving particulate adsorption material forming a moving filter bed, means for supplying said adsorption material into the top end of each filter chamber, means for removing the adsorption material from the bottom end of each filter chamber, a manifold connected to the side of one of said housings for supplying air or gas to the filter chamber in said one housing and a manifold connected to the side of the other housing for removing air or gas therefrom and intermediate guide ducts extending between said two housings, the adsorption chambers in said housings having at least upper and lower adsorption zones with the guide ducts extending between the lower adsorption zone of said one housing and the upper adsorption zone of the other housing and between the upper adsorption zone of the one housing and the lower adsorption zone of the other housing.

7. A moving-bed filtering apparatus according to claim 6, wherein said ducts extend cross-wise between said two parallel housings so as to place the lower adsorption zones of each of said housings in communication with the upper adsorption zones of the other housings.

* * * * *